United States Patent [19]
Gretz

[11] Patent Number: 5,823,482
[45] Date of Patent: Oct. 20, 1998

[54] WIRING DEVICE SUPPORT

[75] Inventor: Thomas J. Gretz, Clarks Summit, Pa.

[73] Assignee: Arlington Industries, Inc., Scranton, Pa.

[21] Appl. No.: 781,724

[22] Filed: Jan. 10, 1997

[51] Int. Cl.⁶ .................. G12B 9/10; H01H 9/02
[52] U.S. Cl. .......... 248/27.1; 248/906; 248/903; 248/544; 174/54; 174/58
[58] Field of Search .................. 248/27.1, 906, 248/903, 544, 558; 174/50, 54, 58, 55, 63, 66, 67; 52/220.8; 411/539, 541, 546; D23/269

[56] References Cited

U.S. PATENT DOCUMENTS

| | | | |
|---|---|---|---|
| 1,432,294 | 10/1922 | Jungk | 411/539 |
| 2,002,491 | 5/1935 | Despard | 174/55 |
| 2,485,406 | 10/1949 | Paine | 248/903 X |
| 2,733,036 | 1/1956 | Meletio | 248/27.1 X |
| 3,437,737 | 4/1969 | Wagner | 174/55 |
| 3,544,053 | 12/1970 | Ingalls | 248/903 X |
| 5,005,792 | 4/1991 | Rinderer | 248/906 X |
| 5,221,814 | 6/1993 | Colbaugh et al. | 174/58 X |
| 5,598,998 | 2/1997 | Lynn | 248/906 X |

OTHER PUBLICATIONS

Tear Sheets Showing RLC Device Leveler and Retainer.

*Primary Examiner*—Ramon O. Ramirez
*Assistant Examiner*—Stephen S. Wentsler

[57] ABSTRACT

A wiring device support for supporting electrical devices such as duplex receptacles, switches, Decora switches or ground fault circuit interrupters. The C-shaped wiring device includes a ramp portion on the top inside perimeter of the C, a tapered notch portion on another end of the inside perimeter of the C, and an integral rib extending substantially around the inner periphery of the C. The wiring device support may be used to support an existing electrical device which is loose or has sunken into a wall by loosening the existing electrical device, sliding the wiring device between the electrical device and the electrical box, and retightening the screws.

2 Claims, 3 Drawing Sheets

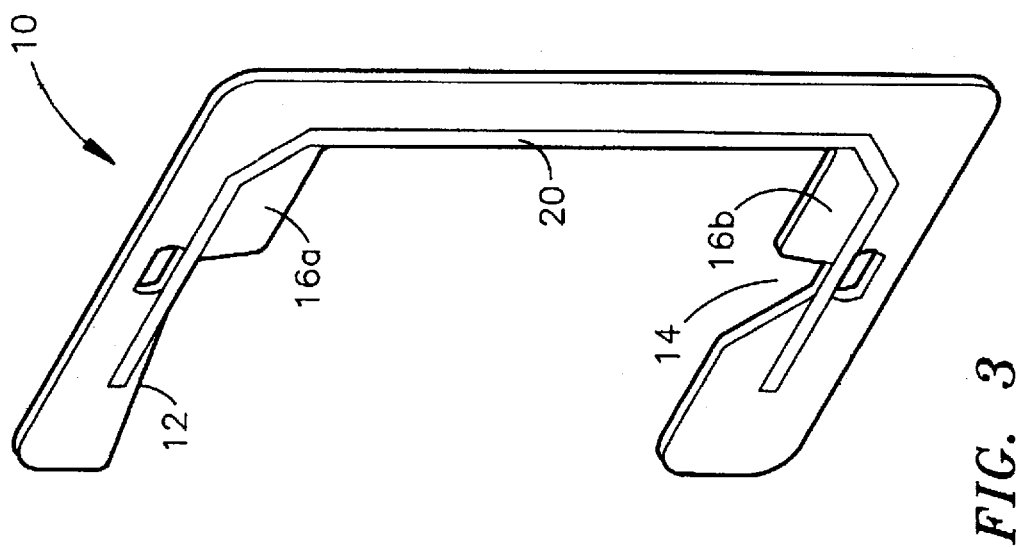
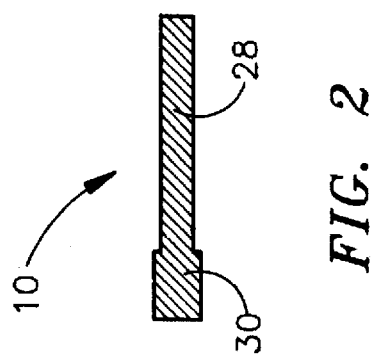
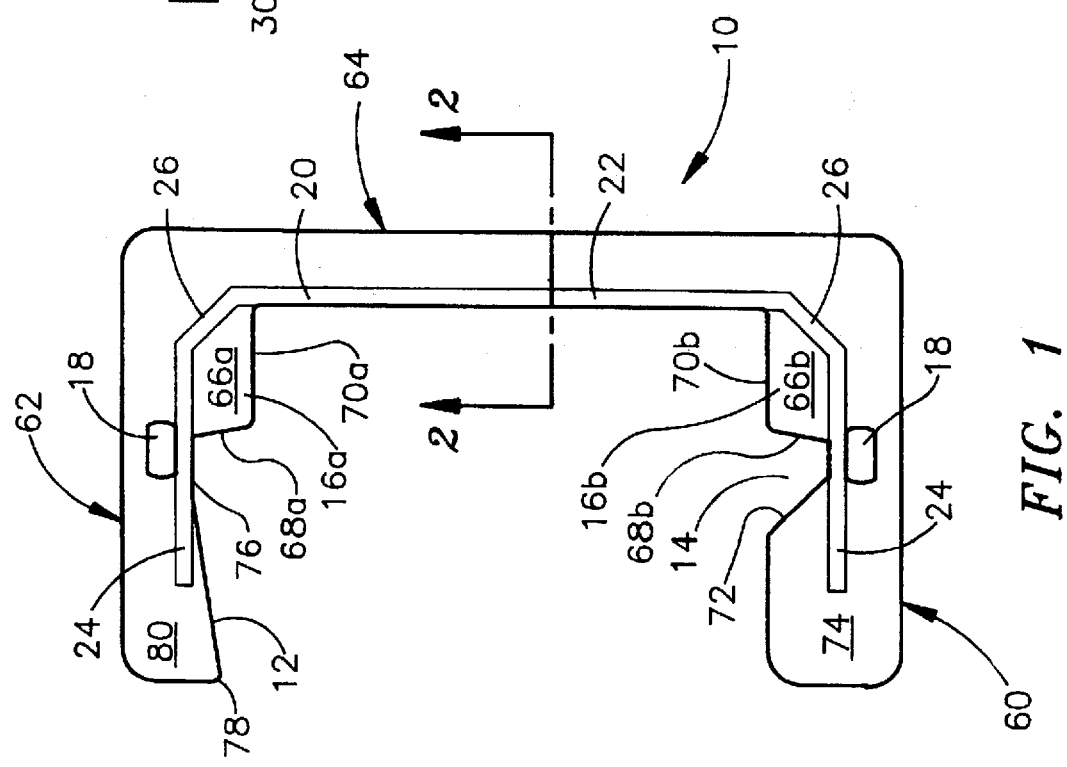

WIRING DEVICE SUPPORT

FIELD OF THE INVENTION

This invention relates to wiring device supports, and particularly, to an improved wiring device support that is elastic and keeps its shape better than those of the present art, is electrically non-conductive and will not short out the wiring device it is used to support, and can be used with a Decora switch or a ground fault interrupt (GFI) device.

BACKGROUND OF THE INVENTION

Wiring device supports are commonly used to support wall mounted electrical devices such as duplex receptacles or switches. Wiring devices of the present art are formed of sheet metal which is electrically conductive and can short out the wiring device. As the present art wiring device supports are constructed of sheet metal, they also have the disadvantage of not having the ability to spring back into shape and usually when bent stay permanently bent. Another disadvantage of present wiring device supports is that they are of a shape that cannot be used with ground fault circuit interrupters (GFCI).

As described by these several limitations, wiring devices of the present art have not proven fully satisfactory for supporting wall mounted wiring devices.

SUMMARY OF THE INVENTION

This invention consists of a specially shaped wiring device support for supporting electrical devices such as duplex receptacles, switches, Decora switches or ground fault circuit interrupters. The wiring device of the present invention is constructed of plastic and includes an integral rib to allow the wiring device to retain its elasticity and its ability to spring back into its original shape so that it may be reused. The wiring device support is made of plastic that will not conduct electricity and will not short out the wiring device that it is used in conjunction with. This is one advantage over present wiring device supports that are constructed of sheet metal. The wiring device support of the present invention because of its unique shape also has the advantage of ease of effective use as well as being able to support other devices such as ground fault circuit interrupters, which is usually not possible with present wiring device supports.

OBJECTS AND ADVANTAGES

A principal object of the present invention is to provide a wiring device support that is easy to effectively use, is inexpensive, and will not conduct electricity and short out wiring devices as will the sheet metal wiring device supports of the present art.

A second object of the present invention is to provide a plastic wiring device support with an integral rib that allows the support to retain its ability to spring back into its original shape. This allows the wiring device to spring back into its original shape after being deformed.

A third object of the present invention is to provide a wiring device support that can be used with special electrical devices such as or ground fault circuit interrupters. The wiring device support of the present invention has a unique design that allows it to be readily installed to support these devices.

Other objects and advantages of the preferred embodiment will become apparent when reading the attached description of the invention and referring to the associated drawings.

DESCRIPTION OF THE DRAWINGS

FIG. 1 is a plan view of the preferred embodiment of the wiring device support.

FIG. 2 is a cross-sectional view of the wiring device support taken along lines 2—2 of FIG. 1.

FIG. 3 is a perspective view of the wiring device support of the present invention.

DESCRIPTION OF THE INVENTION

Figure 5:
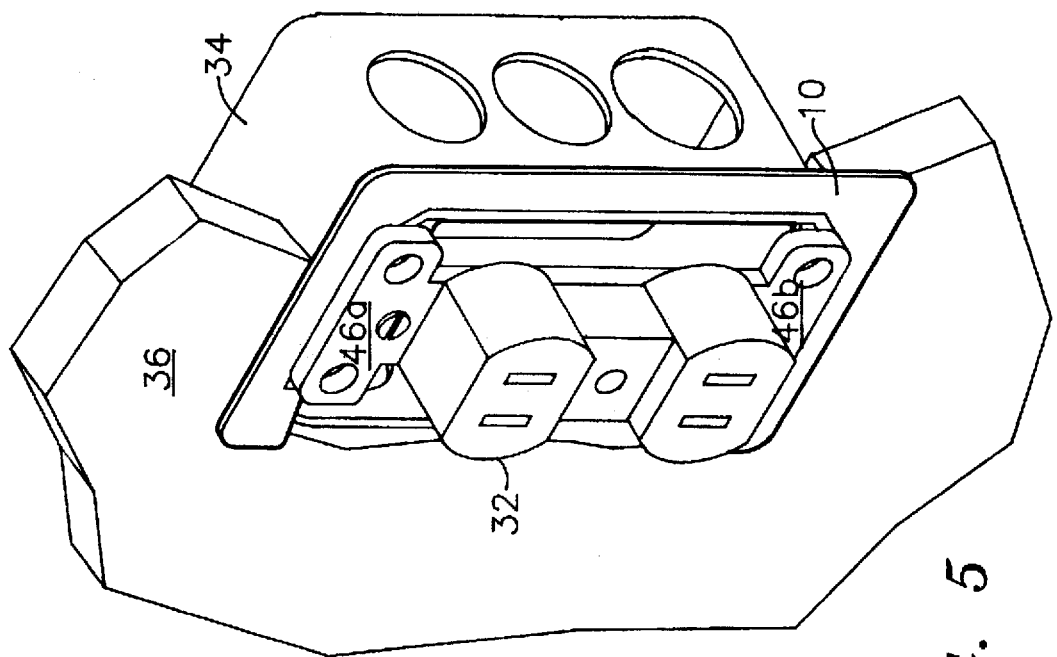
FIG. 5 is a perspective view of the wiring device support of the present invention fully installed between the duplex receptacle and the wall.

The invention is a wiring device support for supporting an electrical device when it is connected to an electrical box mounted within a wall. The wiring device support is used to eliminate device push back in over-sized dry wall cutouts. It works with all types of devices including the Decora type and the ground fault circuit interruptors. For standard duplex receptacles or standard switches, the wiring device support may be installed without removing the device.

A plan view of the preferred embodiment of the wiring device support 10 is given in FIG. 1. The support is molded of a single piece of plastic, preferably a flame retardant polypropylene such as polyflam, and is generally a C-shaped device. The support includes a first end or arm 60, a second end or arm 62, and a side 64 which is longer than the two shorter ends or arms. The second end 62 includes a ramp or tapered section 12, a bottom corner stop 16b, and bottom aperture 18. The first end 60 includes a notch 14, top corner stop 16a, and aperture 18. The apertures allow support of Decora or GFCI devices. The support also includes an integral rib 20 for reinforcing the support to improve its springiness after being bent. The rib 20 has a side portion 22, end portions 24, and corner portions 26. When the support is installed, the rib 20 is designed to clear all of the electrical devices that are currently on the market and also give the strengthening and stiffening that are needed to allow the support to be pushed into place. The corner stops 16a, 16b limit the travel of the wiring device support 10 as it is installed, positioning the wiring device support against the screws where it will be fastened. Each corner stop fills its respective corner with a top planar flange 66a and bottom planar flange 66b both of which have straight interior edges 70a and 70b, respectively. The top stop edge 68a and bottom stop edge 68b normally would rest against the screws that have been previously loosened on the device. Both top stop edge 68a and bottom stop edge 68b are angled to preferably 10 degrees from the vertical.

The support is preferably 4.25 inches tall and 2.47 inches wide with the width of the longer side 64 being 0.42 inches. The apertures 18 are centered on the width at each end.

FIG. 2 is a cross-sectional view of the wiring device support 10 taken along lines 2—2 of FIG. 1. The cross-sectional view shows that the wiring device support 10 is thicker across the rib portion 30 containing the integral rib 20 than across the non-rib portion 28. The rib is preferably 0.09 inches wide and 0.06 inches thick and the non-rib portion is 0.01 inches thinner on each side for a total thickness of 0.04 inches.

FIG. 3 is a perspective view of the wiring device support 10 of the present invention. The ramp 12 and top corner stop 16a work in conjunction to position the wiring device support at the top screw (not shown). The notch 14 and the bottom corner stop 16b work in conjunction to position the wiring device support at the bottom screw (not shown). These positions of top and bottom can be reversed at the option of the user.

Figure 4:
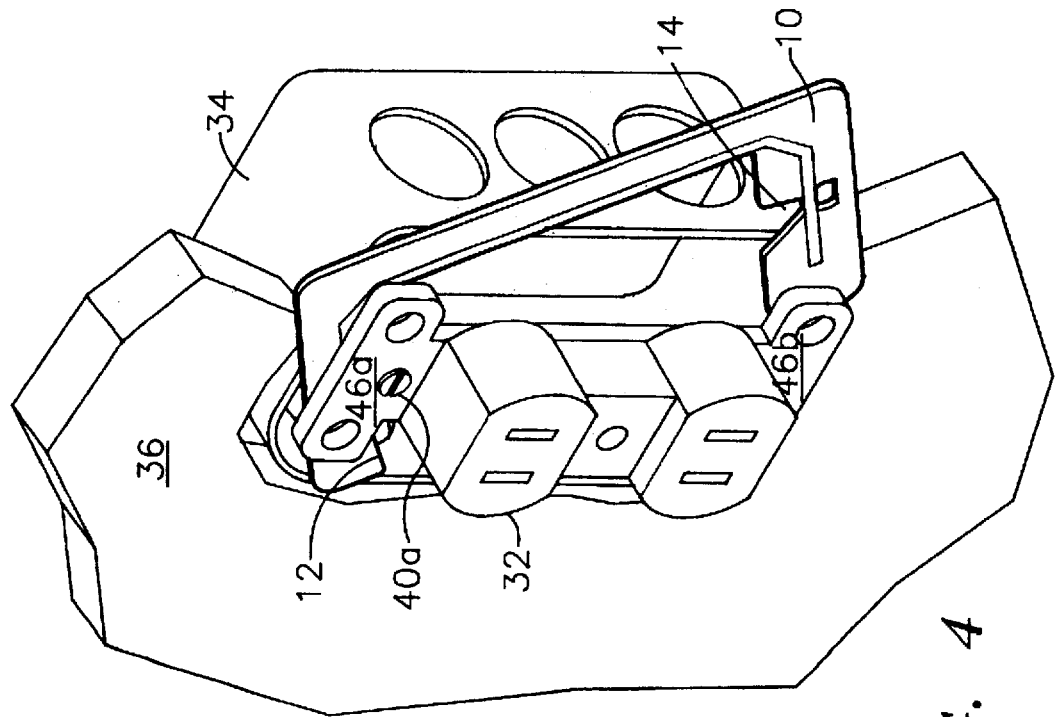
FIG. 4 is a perspective view of the wiring device support of the present invention being installed by an alternative method on a wall mounted duplex receptacle which is mounted to an electrical box within a wall, the top portion of the wiring device support is shown just engaging the top screw of the receptacle with the bottom portion of the wiring device support free.

FIG. 4 is a perspective view of the wiring device support 10 of the present invention being installed by an alternative method on a wall mounted duplex receptacle 32 which is mounted to an electrical box 34 within a wall 36. The top portion of the wiring device support is shown with the ramp 12 just engaging the top screw 40a of the receptacle with the bottom portion of the wiring device support free. The wiring device support 10 is installed, alternatively, in the manner depicted in FIG. 4. The screws 40a and 40b (not shown), holding the duplex receptacle 32 to the electrical box 34 are loosened slightly to allow clearance for the wiring device support 10 between the receptacle 32 and the box 34. The top portion of the wiring device support 10, containing the ramp 12 and top corner stop 16a (not shown), are first slid between the top ear 46a of the receptacle 32 and the box 34. The top portion is inserted with the ramp 12 edge on top screw 40a and is slid inward until the top screw 40a contacts top corner stop 16a (not shown) which stops the inward travel of the wiring device support 10 and seats it between the duplex receptacle 32 and the electrical box 34. The integral rib 20, which is thicker than the main body portion of the wiring device support 10, serves as a lever to put more pressure between the duplex receptacle 32 and the electrical box 34. The rib 20 acts as a strengthening spring when screws 40a and 40b (not shown) are retightened, helping the duplex receptacle stay tight against the wall 36 and the box 34.

The bottom portion of the wiring device support 10 is then pushed and twisted inward until the notch 14 snaps around the lower screw 40b (not shown). The completely installed wiring device support 10 is shown in FIG. 5.

The preferred order of installation can be reversed with the notch 14 being installed first and the ramp portion being swung and twisted into position. The inherent flexibility, spring-back and shape of the wiring device support enables its ready and easy installation.

The notch 14 about which the support is preferably swung when put into position has its bottom terminated at end portion of rib 24 and one edge as the bottom stop edge 68b which is angled at 10 degrees. The opposite edge is angled flange edge 72 which has a 45 degree angle. Thus, the total entrance angle of the notch is 55 degrees. It is to be noted that the height of the bottom planar flange 66b of the corner stop is the same height as the outer notch end planar flange 74. The height of the flange including the part both inside and outside the rib is preferably 0.72 inches and this applies to the height of both sides of the notch 14.

The ramp 12 is at an angle of 9 degrees from the horizontal or 81 degrees from the vertical. It extends from the inside of the end portion of the rib 24 at inner ramp end 76 in the vicinity of the edge of the aperture 18 to the outer ramp end 78 at the outer edge of outer ramp end planar flange 80. The height of the outer edge of ramp end planar flange 80 is preferably 0.55 inches which is less than the height of top planar flange 66a including the part of the flange above the rib which is preferably 0.72 inches.

It is to be noted that the rib 20 forms both one edge of aperture 18 and the bottom of both the ramp 12 and notch 14. This serves to reinforce the support at critical points. Also, it is to be noted that outer ramp end planar flange 80 adds to the total flange area to protect the wiring device support from push-back in over-sized drywall cutouts.

Figure 6:
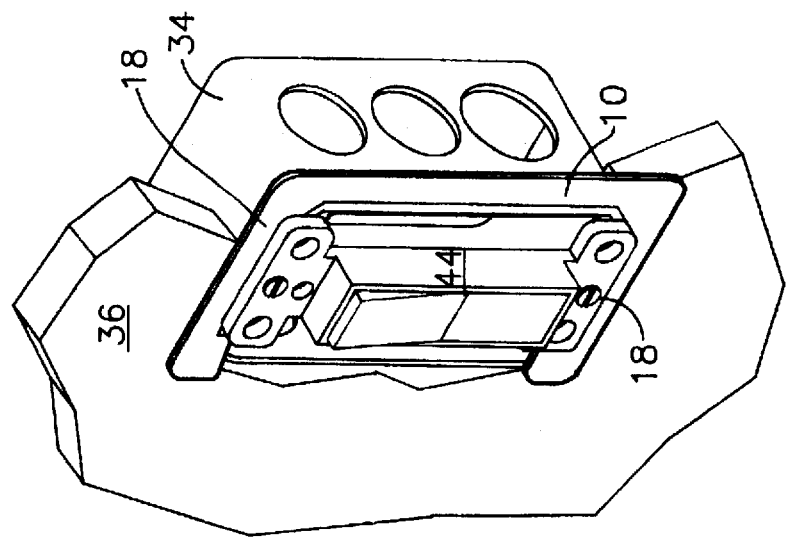
FIG. 6 is a perspective view of two wiring device supports being used together to support a duplex electrical receptacle, thereby illustrating how two wiring device supports of the present invention may be used together when one would not adequately support an electrical device.

FIG. 6 is a perspective view of two wiring device supports 10a, 10b being used together to support a duplex electrical receptacle 32, thereby illustrating how two wiring device supports of the present invention may be used together when one would not adequately support an electrical device. One wiring device support 10a is inserted from the right side and the other 10b is inserted from the left side.

Figure 7:
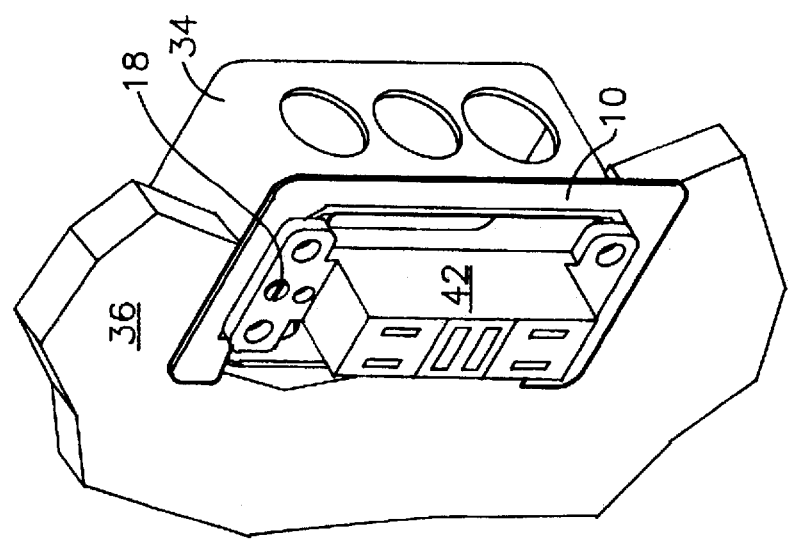
FIG. 7 is a perspective view of the wiring device support of the present invention being used to support a ground fault circuit interrupter duplex receptacle.

FIG. 7 is a perspective view of the wiring device support 10 of the present invention being used to support a ground fault circuit interrupter duplex receptacle 42. For a GFCI receptacle 42, the apertures 18 formed in the upper and lower portions (lower one not shown) of the wiring device support 10 are used to secure the support between the GFCI receptacle 42 and the electrical box 34.

Figure 8:
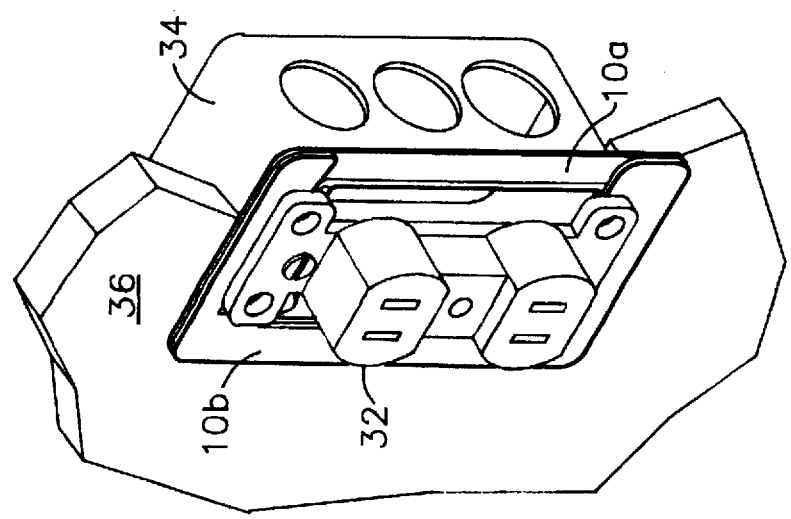
FIG. 8 is a perspective view of the wiring device support of the present invention being used to support a Decora switch.

FIG. 8 is a perspective view of the wiring device support 10 of the present invention being used to support a Decora switch 44. For a Decora switch 44, the apertures 18 formed in the upper and lower portions of the wiring device support 10 are also used to secure the support between the Decora switch 44 and the electrical box 34, just as for the GFCI. When installing the wiring device support 10 with a GFCI duplex receptacle or with a decora switch, the GFCI or decora device must be removed first. The wiring device support is first positioned with its apertures 18 positioned over the proper bosses within the electrical box 34, the electrical device is then positioned with its screwholes aligned with the bosses, a cover appropriate to the device is aligned with the same bosses, and the screws are inserted and tightened into the bosses.

Although there has been shown and described an example of what is at present considered the preferred embodiment of the present invention, it will be obvious to those skilled in the art that various changes and modifications may be made therein without departing from the scope of the invention as defined by the appended claims.

What is claimed is:

1. A one-piece plastic thin planar C-shaped wiring device support comprising:

a first short end having an inner periphery, an outboard side and a connected side;

a second short end having an inner periphery, an outboard side and a connected side;

a long side having an inner periphery connecting said first short end at said connected side of said first short end and said second short end at said connected side of said second short end;

an aperture centered on each of said first short end and said second short end;

an angled notch located on said inner periphery of said first short end and having a first angled side edge, a second angled side edge and a bottom;

said first angled side edge of said angled notch extending from said bottom of said notch at approximately 10 degrees from the vertical;

said second angled side edge extending from said bottom of said notch at approximately 45 degrees from the vertical so that said notch diverges open at approximately 55 degrees;

a ramp located on said inner periphery of said second short end with said ramp extending from an inner terminus near said aperture on said second short end to said outboard side of said second short end with said ramp inclined towards said outboard side at an angle of approximately 81 degrees to the vertical;

a rib approximately 0.09 inches wide and approximately 0.02 inches thicker than the remainder of said support, the rib extending on said first short end between said bottom of said notch and said aperture on said first short end, at said inner periphery of said long side and on said second short end between said aperture on said second short end and said inner terminus of said ramp; and said first short end, said second short end and said long side having a thickness of approximately 0.04 inches with the overall height of said support being approximately 4.25 inches and the overall width being approximately 2.47 inches.

2. A one-piece plastic thin planar C-shaped wiring device support comprising:

a first short end having an inner periphery, an outboard side and a connected side;

a second short end having an inner periphery, an outboard side and a connected side;

a long side having an inner periphery connecting said first short end at said connected side of said first short end and said second short end at said connected side of said second short end;

an angled notch located on said inner periphery of said first short end and having a first angled side edge, a second angled side edge and a bottom;

said first angled side edge of said angled notch extending from said bottom of said notch at an angle from the vertical;

said second angled side edge extending from said bottom of said notch at approximately 45 degrees from the vertical so that said notch diverges open;

a ramp located on said inner periphery of said second short end with said ramp extending from an inner terminus on said second short end to said outboard side of said second short end with said ramp inclined towards said outboard side at an angle from the vertical;

a thin rib extending on said first short end between said bottom of said notch at the said inner periphery of said long side and on said second short end adjacent said inner terminus of said ramp; and said first short end, said second short end and said long side having a thickness less than the thickness of said thin rib with the overall height of said support being greater than the overall width of said support.

* * * * *